(12) United States Patent
Still

(10) Patent No.: US 7,181,968 B2
(45) Date of Patent: Feb. 27, 2007

(54) CONFIGURABLE ACCELEROMETER ASSEMBLY

(75) Inventor: Charles Still, Clinton, MI (US)

(73) Assignee: Autoliv ASP, Inc., Ogden, UT (US)

( * ) Notice: Subject to any disclaimer, the term of this patent is extended or adjusted under 35 U.S.C. 154(b) by 135 days.

(21) Appl. No.: 10/926,130

(22) Filed: Aug. 25, 2004

(65) Prior Publication Data

US 2006/0042381 A1    Mar. 2, 2006

(51) Int. Cl.
*G01P 1/02* (2006.01)

(52) U.S. Cl. ............... 73/493; 73/431; 73/866.5; 361/636; 361/640; 361/719; 361/720; 361/730; 361/755

(58) Field of Classification Search ............ 73/493, 73/866.5, 431; 361/636, 640, 720, 719, 730, 361/755

See application file for complete search history.

(56) References Cited

U.S. PATENT DOCUMENTS

| | | | |
|---|---|---|---|
| 5,554,806 A | | 9/1996 | Mizuno et al. |
| 5,719,334 A | * | 2/1998 | Parsons ................. 73/514.01 |
| 6,060,780 A | * | 5/2000 | Ohta et al. ................. 257/731 |
| 6,094,984 A | * | 8/2000 | Asano et al. ................. 73/493 |
| 6,101,877 A | * | 8/2000 | Broker et al. ................. 73/493 |
| 6,216,537 B1 | | 4/2001 | Henschel et al. |
| 6,375,512 B1 | * | 4/2002 | Zito et al. ................. 439/660 |
| 6,416,139 B2 | * | 7/2002 | Warner et al. ........... 303/119.3 |
| 6,607,401 B1 | | 8/2003 | Weaver, Jr. et al. |

FOREIGN PATENT DOCUMENTS

| | | |
|---|---|---|
| DE | 10145 679 A1 | 4/2003 |
| EP | 0 721 108 A2 | 7/1996 |
| GB | 2 300 047 A | 10/1996 |

* cited by examiner

*Primary Examiner*—Hezron Williams
*Assistant Examiner*—Samir M. Shah
(74) *Attorney, Agent, or Firm*—Sally J Brown; Brinks Hofer Glison & Lione

(57) ABSTRACT

An improved accelerometer assembly including a circuit board and an accelerometer is provided. The accelerometer is configured to sense acceleration along a sensing axis. The accelerometer is attached to the circuit board and configured to sense acceleration along a sensing axis. A housing is configured to receive the circuit board in a first and second orientation, wherein the sensing axis in the first orientation is rotated 90° from the sensing axis in the second orientation.

12 Claims, 5 Drawing Sheets

CONFIGURABLE ACCELEROMETER ASSEMBLY

BACKGROUND

1. Field of the Invention

The present invention generally relates to an accelerometer assembly and more particularly to an accelerometer used as a sensor for a motor vehicle occupant protection system.

2. Description of Related Art

Accelerometers are well known in the industry of electronic motor vehicle crash sensing. Accelerometers used as crash sensors produce an electrical signal corresponding to the linear acceleration and deceleration of the accelerometer along a sensing axis. Generally, systems requiring linear acceleration to be measured with respect to multiple axes use multiple accelerometers. Typically, each accelerometer has its sensing axis aligned with the axes of the coordinate system in which the acceleration is to be measured. To measure a three-dimensional acceleration vector, three accelerometers are used, with each accelerometer having a sensing axis oriented 90° relative to the sensing axis of the other two accelerometers.

Typically, custom packaging is designed to mount or house accelerometers having different sensing axis orientations. However, for reduced cost and enhanced ease of use it may be desirable to utilize common components and mounting for accelerometer assemblies with different sensing axis orientations.

In view of the above, it is apparent that there exists a need for an improved accelerometer assembly.

SUMMARY OF THE INVENTION

In satisfying the above need, as well as overcoming the enumerated drawbacks and other limitations of the related art, the present invention provides an improved accelerometer assembly including a circuit board and an accelerometer.

The accelerometer is attached to the circuit board and configured to sense acceleration along a sensing axis. A housing is configured to receive the circuit board in a first and second orientation, wherein the sensing axis in the first orientation is rotated 90° from the sensing axis in the second orientation. As such, the same circuit board subassembly may be readily used to sense in one of two axes. Utilizing the same circuit board assembly to sense that both axes reduces the need to produce and maintain inventories of multiple components thereby decreasing cost and increasing availability.

In another aspect of the present invention, the circuit board has a rotational axis defined at a 45° offset relative to the sensing axis. Connection points are located on the circuit board allowing the accelerometer signals to be communicated to other devices through pins or wires attached to the connection points. The connection points form a geometrically symmetric pattern with respect to the rotational axis, such that, the circuit board may be rotated 180° about the rotational axis thereby rotating the sensing axis by 90°, while maintaining the location of the geometrically symmetric pattern of connection points.

In another aspect of the present invention, a first set of connection points on a first side of the rotational axis are duplicates of a second set of connection points on a second side of the rotational axis. As such, a functional pin configuration of the plurality of connection points is consistent in both a first orientation and a second orientation, where the second orientation is rotated 180° about the rotational axis from the first orientation.

In another aspect of the present invention, a first and second set of connection points have a pattern with the same geometric shape. Further, the housing is configured to receive the first set of connection points in the first orientation, and the second set of connection points in the second orientation.

Further objects, features and advantages of this invention will become readily apparent to persons skilled in the art after a review of the following description, with reference to the drawings and claims that are appended to and form a part of this specification.

DETAILED DESCRIPTION OF THE INVENTION

Figure 1:
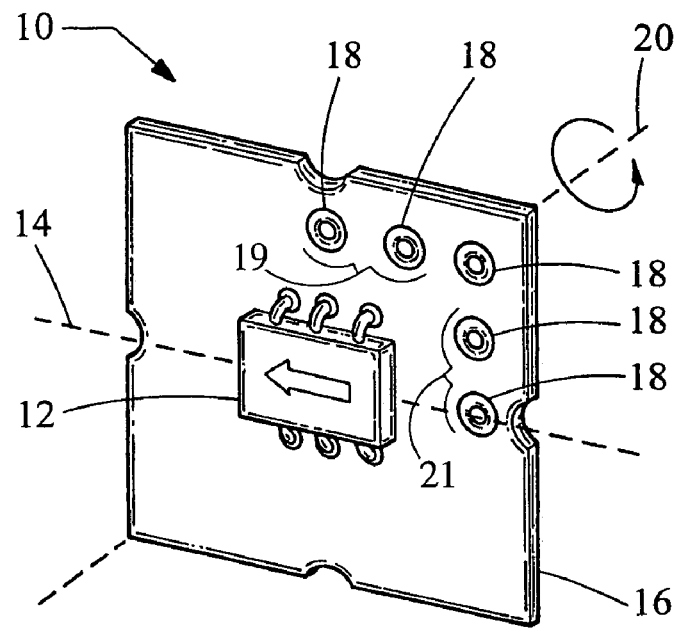
FIG. 1 is a perspective view of the top of an accelerometer assembly in a first orientation in accordance with the present invention.

Referring now to FIG. 1, an accelerometer assembly embodying the principles of the present invention is illustrated therein and designated as 10. The accelerometer assembly 10 includes an accelerometer 12 and a circuit board 16.

The accelerometer 12, shown as a surface mount device, is configured to create an electrical signal corresponding to the acceleration imparted on the accelerometer 12 along a sensing axis 14. The accelerometer 12 is mounted onto the printed circuit board 16. The printed circuit board 16 includes a number of connection points 18, to which, pins may be connected providing electrical communication between the accelerometer assembly 10 and any device configured to receive the electrical signal.

Figure 2:
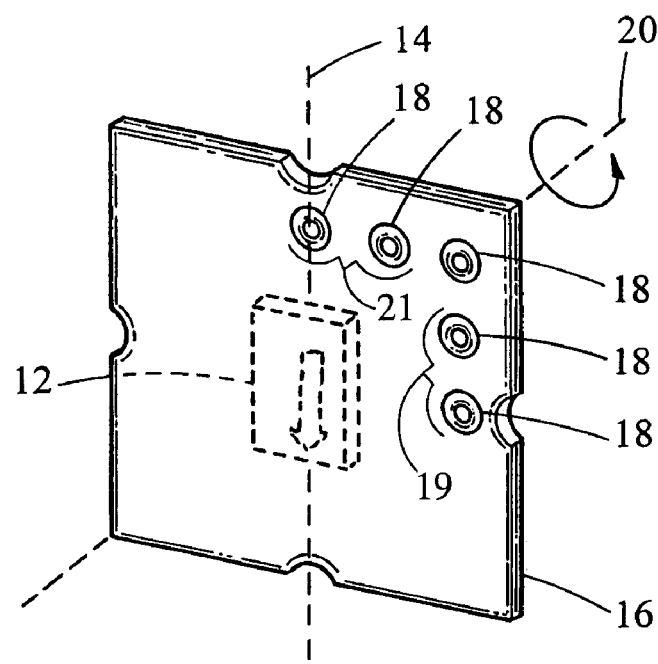
FIG. 2 is a perspective view of the bottom of an accelerometer assembly in a second orientation in accordance with the present invention.

To improve ease of manufacture and the reuse of components, the accelerometer assembly 10 may be used in two orientations allowing same components and consistent connections to be used to sense acceleration along two separate sense axes. This can be accomplished by rotating or flipping the accelerometer assembly 10 around a rotation axis 20 that is oriented 45° between the two orthogonal sense axes to be measured. For example, FIG. 1 shows the first orientation of the accelerometer assembly 10, while FIG. 2 shows a second orientation of the accelerometer at assembly 10. In FIG. 1, the accelerometer 12 is mounted on the top of the circuit board 16, while alternatively, in FIG. 2, the accelerometer 12 is viewed through the bottom of the circuit board 16. Notably, the connection points 18 form a geometrically symmetric pattern with respect to the rotation axis 20. The geometrically symmetric pattern allows the same pin configuration to be used in either the first or second orientation, allowing a consistent housing and connector to be used to sense along the two orthogonal sense axes.

Further, a first set of connection points 19 on a first side of the rotational axis 20 are duplicate connections of a second set of connection points 21 on a second side of the rotational axis 20 such that the functional pin configuration of the connection points 18 is consistent in both the first and second orientations. One method of accomplishing duplicate connection points is by providing traces on the circuit board 16 connecting each corresponding connection point in the two sets of connection points 19, 21. This allows a connector with the same pin out to be used in either orientation. In this configuration, pins may be attached to the connection points 18 along one side of the geometrically symmetric configuration, while no pins are connected to the duplicate set of pins. This would reduce complexity of the connector assembly and the number of components used. Alternatively, pins may be connected to all of the connection points 18 providing duplicate signals, if desired.

Figure 3:
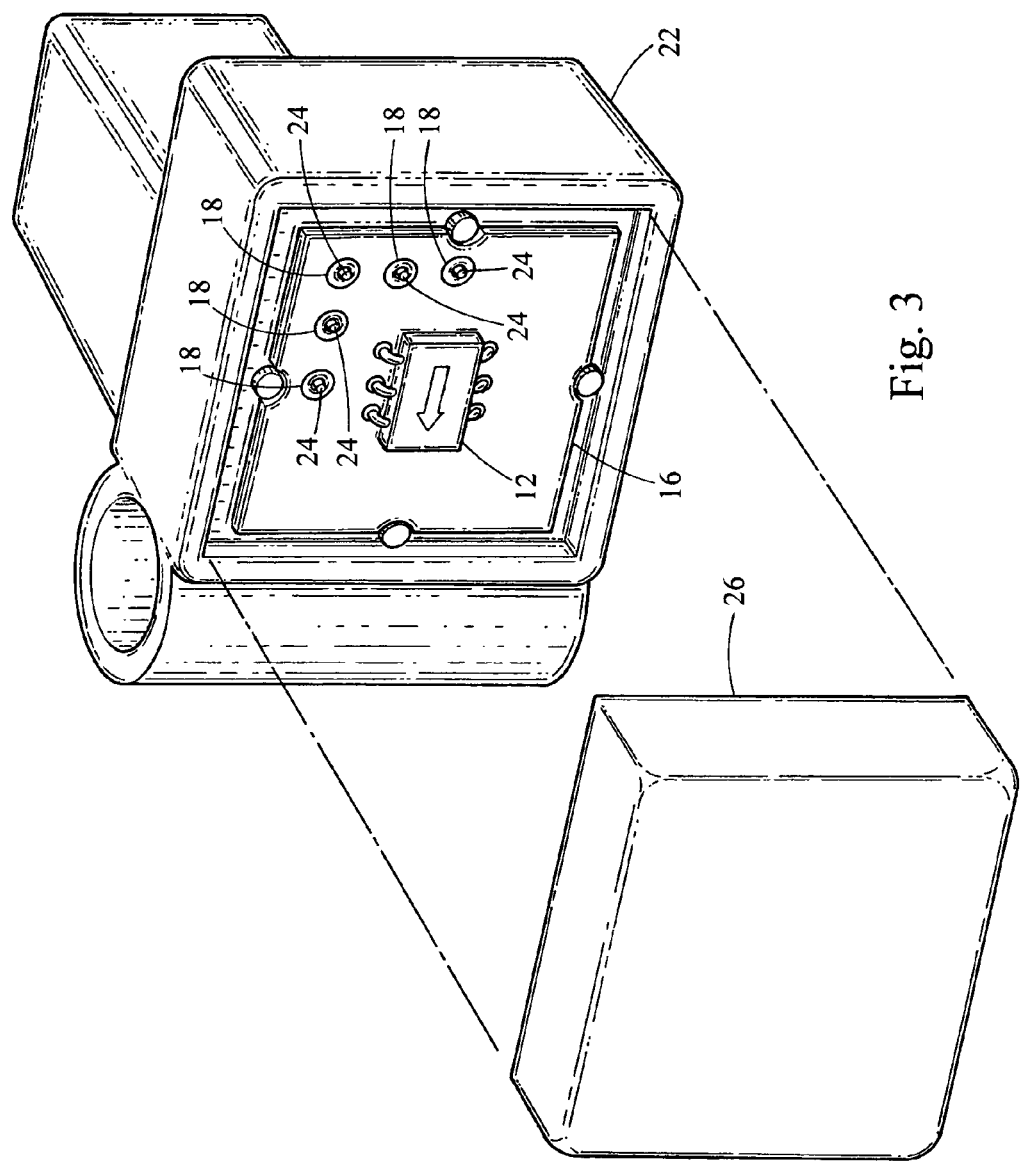
FIG. 3 is a perspective view of the accelerometer circuit board in the first orientation mounted in an accelerometer assembly housing.

Now referring to FIG. 3, a perspective side view of the circuit board 16 is provided. The circuit board 16 is positioned in the first orientation and mounted to housing 22. In this orientation the accelerometer 12 is located on the side of the circuit board 16 facing a cover 26. The pins 24 may be attached to the circuit board 16 prior to being inserted into the housing 22, or alternatively, the pins 24 may be stitched or insert molded into the housing 22 and the circuit board 16 received over the pins 24. The pins 24 are then soldered to the circuit board connection points 18. Alternatively, the pins 24 may be attached to connection points 18 through a mechanical interference, such as, a press fit or locking mechanism. The cover 26 is then fastened over the circuit board 16 to protect the accelerometer 12 and connection points 18.

Figure 4:
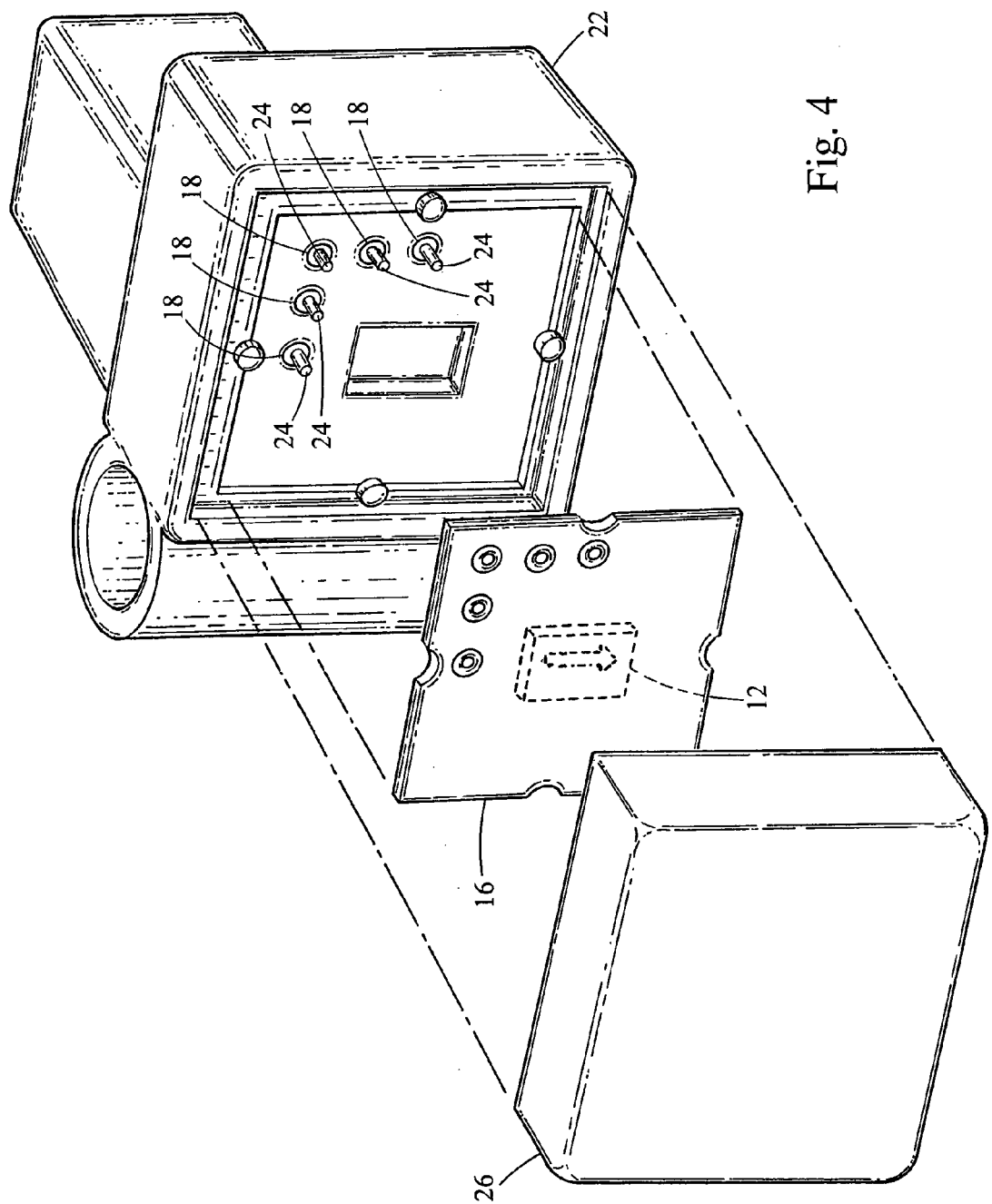
FIG. 4 is a perspective view of the accelerometer circuit board in the second orientation mounted in the accelerometer assembly housing.

Now referring to FIG. 4, the circuit board 16 is shown mounted in the housing 22 in the second orientation, where the accelerometer 12 is attached to the side of the circuit board 16 facing the inside of the housing 22. Further, the housing 22 includes a recess to receive the accelerometer 12 extending from the surface of the circuit board 16. As can be noted from FIGS. 3 and 4, the two orthogonal sense axes are accommodated using the same housing 22 in a consistent orientation by mounting the circuit board 16 in the two described orientations and utilizing the geometrical symmetric pattern to provide access to the connection points.

Figure 5:
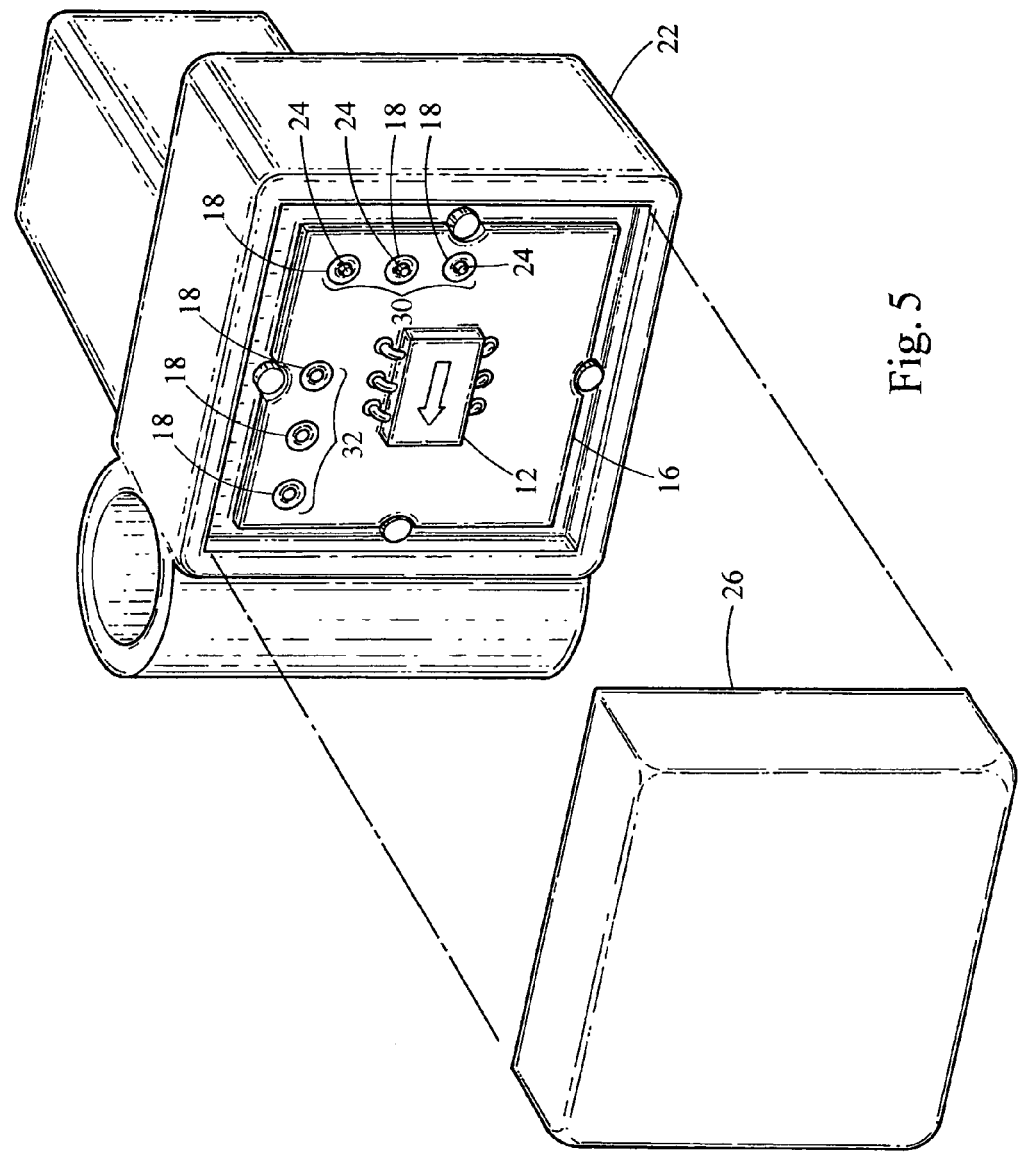
FIG. 5 is a perspective view of the accelerometer circuit board in the first orientation mounted in an accelerometer assembly housing.
Figure 6:
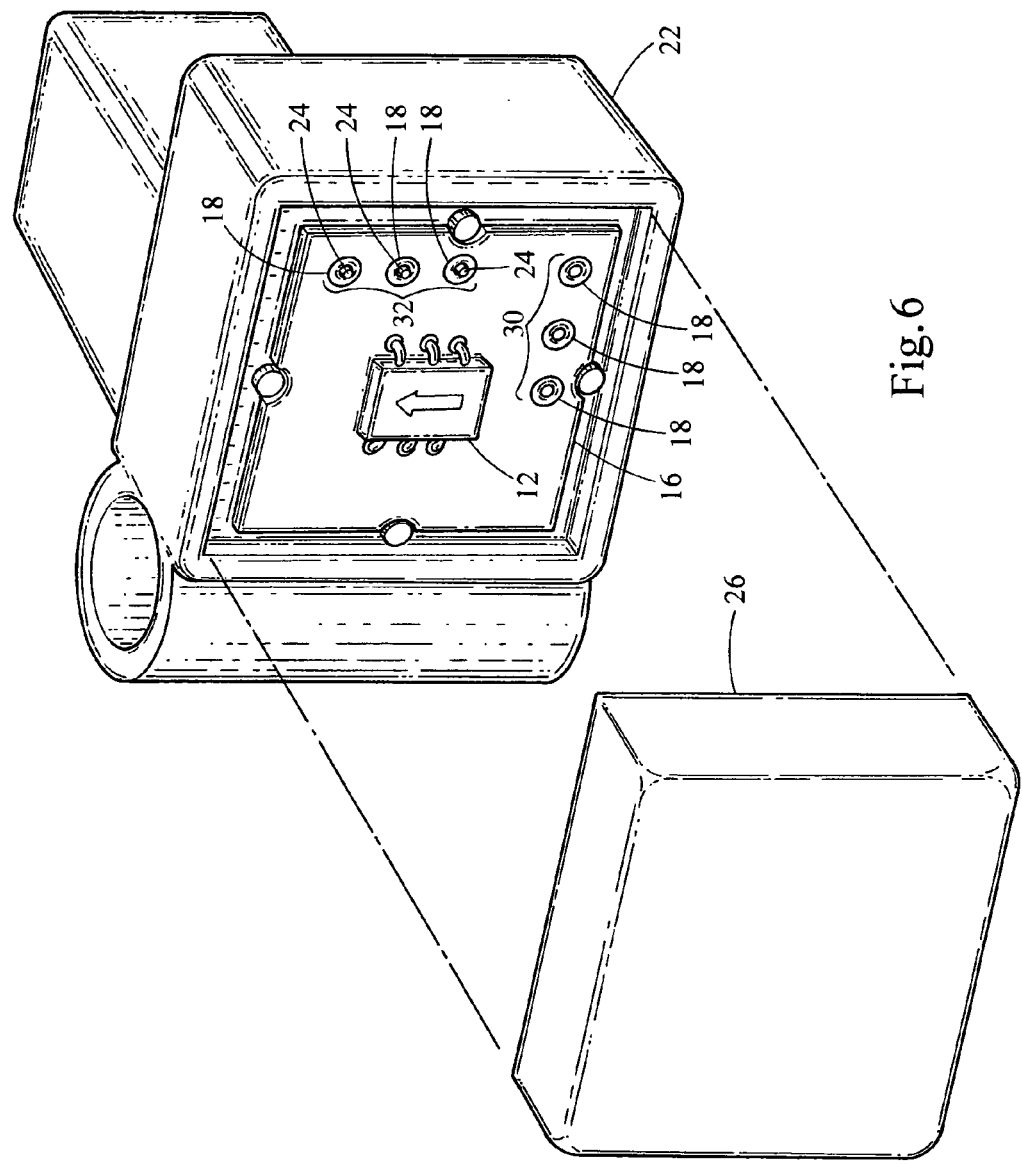
FIG. 6 is a perspective view of the accelerometer circuit board in the second orientation mounted in the accelerometer assembly housing.

Another embodiment of the present invention is provided in FIGS. 5 and 6. FIG. 5 depicts the circuit board 16 in a first orientation relative to the housing 22. In this embodiment, the connection points 24 include a first set of connection points 30 and a second set of connection points 32. The first and second set of connection points 30, 32 have the same geometric shape, such that, the housing 22 may receive the first set of connection points 30 when the circuit board 16 is in the first orientation. Alternatively, the housing 22 receives the second set of connection points 32 when the circuit board 16 is in the second orientation, in this instance rotated 90° about the center of the circuit board 16. In the first orientation, pins 18 provide an electrical connection to the first set of connection points 30. In the second orientation, as shown in FIG. 6, the pins 18 provide an electrical connection to the second set of connection points 32. As such, a first set of connection points 30 may be a duplicate of the second set of connection points 32 such that a functional pin configuration of the plurality of connection points 24 is consistent in both the first and second orientations.

As a person skilled in the art will readily appreciate, the above description is meant as an illustration of implementation of the principles of this invention. This description is not intended to limit the scope or application of this invention in that the invention is susceptible to modification, variation and change, without departing from spirit of this invention, as defined in the following claims.

I claim:

1. An accelerometer assembly comprising:
a circuit board having a plurality of connection points;
an accelerometer attached to the circuit board, the accelerometer having a sensing axis;
a housing configured to receive the circuit board in a first and second orientation, wherein the sensing axis in the first orientation is rotated 90° from the sensing axis in the second orientation; and
wherein the circuit board has a rotational axis defined at a 45° offset to the sensing axis, connection points forming a geometrically symmetric pattern with respect to the rotational axis, such that, the second orientation being rotated 180° about the rotational axis from the first orientation, thereby rotating the sensing axis by 90° while maintaining the location of the geometrically symmetric pattern of connection points.

2. The assembly according to claim 1, wherein a first set of connection points on a first side of the rotational axis are duplicates of a second set of connection points on a second side of the rotational axis such that a functional pin configuration of the plurality of connection points is consistent in both the first and second orientation.

3. The assembly according to claim 1, further comprising pins attached to the housing and configured to provide an electrical connection to the plurality of connection points.

4. The assembly according to claim 1, wherein the pins provide an electrical connection to a set of connection points of the plurality of connection points.

5. The assembly according to claim 1, wherein the pins are insert molded into the housing.

6. The assembly according to claim 1, wherein the pins are stitched into the housing.

7. The assembly according to claim 1, wherein the pins are soldered to the connection points.

8. The assembly according to claim 1, wherein the pins are attached to the connection points through a mechanical interference.

9. An accelerometer assembly comprising:
a circuit board having a plurality of connection points;
an accelerometer attached to the circuit board, the accelerometer having a sensing axis;
a housing configured to receive the circuit board in a first and second orientation, wherein the sensing axis in the first orientation is rotated 90° from the sensing axis in the second orientation; and
wherein the circuit board has a first and second set of connection points, the first set of connection points forming a first pattern and the second set of connection points forming a second pattern having a same geometric shape as the first pattern.

10. The assembly according to claim 9, wherein the housing is configured to receive the first set of connection points in the first orientation, and the second set of connection points in the second orientation.

11. The assembly according to claim 9, wherein the first set of connection points are duplicates of the second set of connection points such that a functional pin configuration of the plurality of connection points is consistent in both the first and second orientation.

12. The assembly according to claim 9, wherein the first orientation is rotated 90° about the center of the circuit board from the second orientation.

* * * * *